(12) United States Patent
Woestmann

(10) Patent No.: US 8,017,002 B2
(45) Date of Patent: Sep. 13, 2011

(54) DEVICE FOR FILTERING A FLUID, PARTICULARLY FOR PLASTIC PROCESSING PLANTS

(75) Inventor: Stefan Woestmann, Sassenberg (DE)

(73) Assignee: Kreyenborg Verwaltungen und Beteiligungen GmbH & Co., KG (DE)

( * ) Notice: Subject to any disclaimer, the term of this patent is extended or adjusted under 35 U.S.C. 154(b) by 733 days.

(21) Appl. No.: 12/094,514

(22) PCT Filed: Jul. 6, 2007

(86) PCT No.: PCT/DE2007/001201
§ 371 (c)(1),
(2), (4) Date: May 21, 2008

(87) PCT Pub. No.: WO2008/025313
PCT Pub. Date: Mar. 6, 2008

(65) Prior Publication Data
US 2008/0283460 A1    Nov. 20, 2008

(30) Foreign Application Priority Data
Aug. 30, 2006 (DE) .................. 10 2006 040 703

(51) Int. Cl.
*B29C 47/68* (2006.01)
*B29C 47/92* (2006.01)

(52) U.S. Cl. ......... 210/134; 210/137; 264/169; 425/199

(58) Field of Classification Search .................. 264/169; 425/197, 199; 210/134, 137, 340
See application file for complete search history.

(56) References Cited

U.S. PATENT DOCUMENTS

| 6,893,151 B2 * | 5/2005 | Giesler et al. .................. 366/78 |
| 6,994,795 B2 * | 2/2006 | Bacher et al. .................. 210/780 |
| 2003/0178740 A1 | 9/2003 | Bacher et al. |

FOREIGN PATENT DOCUMENTS

| DE | 10301536 A1 | 8/2003 |
| DE | 102004036597 B3 | 8/2005 |
| EP | 1208956 A1 | 5/2002 |

* cited by examiner

*Primary Examiner* — Terry Cecil
(74) *Attorney, Agent, or Firm* — Patricia M. Mathers

(57) ABSTRACT

The invention relates to an arrangement and a device for filtering a fluid, particularly for plastic processing plants, wherein the pressure drop, or the flow rate reduction, created by the withdrawal of material from the process is sensitively balanced in that pressure constancy and flow rate constancy are achieved at the discharge duct (3).

7 Claims, 3 Drawing Sheets

DEVICE FOR FILTERING A FLUID, PARTICULARLY FOR PLASTIC PROCESSING PLANTS

BACKGROUND INFORMATION

1. Field of the Invention

The invention relates to a device for filtering a fluid, particularly a liquefied plastic. More particularly, the invention relates to a filter device having a filter slide that contains at least two filter chambers, each chamber containing a filter.

2. Description of the Prior Art

EP 0 554 237 A discloses a filter device for contaminated fluids and a process for its operation. With this known device, at least one supply space for receiving an amount of fluid required during the backwashing process is connected to at least one downstream channel. A piston for displacing fluid out of the supply space is guided in the supply space, whereby, during the backwashing process, this supply space provides a free flowpath connection for the cleaned fluid with both the downstream side of the filter nest that is to be backwashed as well as with the downstream channel. The supply or storage space is filled with plastic material during normal production and, in the case of backwashing, is not only connected to the filter nest that is to be backwashed, but the displacing piston guided in the storage space also acts on the normal production channel, which leads from the filter currently in operation to the equipment or mould. Here the difficulty arises that, at the opening of the storage space into the production channel, the plastic mass that is to be pressed out of the storage space must partially flow against the flow direction in the production channel. Part of the plastic material pressed out of the storage space, however, also flows in the direction of the production channel, i.e., in the direction of the mould. Consequently, problems arise here that are difficult to control in practice.

The pressure constant mentioned in this reference is not attainable, because communicating ducts or channels, i.e., pressure chambers that are connection with each other, are involved here. Furthermore, the resistance in the direction of the backwashing opening is significantly less than that in the direction of the mould, so that a significant drop in pressure must occur at the mould itself.

WO 98/47688 describes a filter device for liquefied plastic, in which a displacing piston also presses a cleaned plastic mass back through the filter, in order to perform the backwashing process. The disadvantage of this arrangement is that valve devices, which close the backflow channel during normal operation, that is, during the production phase, are required. Such valve devices are undesirable in the processing of fluid thermoplastic material, because they can lead to blockages and, naturally, must also be heated. Decomposition of the plastic material can also occur in this area, because the valve device can never be completely cleaned.

Another disadvantage of the known device is that in order to change the filters, the entire valve device must be removed, which means that the construction of the known device is relatively complicated.

The disadvantages of these devices are avoided by the device according to DE 10 2004 036 597 B3. This reference describes a relatively complicated device, which does achieve the desired goal, namely, proposing a device with which the backwashing effect can be significantly improved, but which, at the same time, avoids the loss of mass in the main flow during backwashing, and ensures that the displacing pistons arranged in the channel are always washed with material.

DE 103 01 536 A1 discloses a flow-through sensor located in the discharge channel for a corresponding filter unit. A pressure generator located in the feed channel, namely, a pump or a throttle, is driven as a function of the measured through-flow.

EP 1 208 956 A1 discloses driving an extruder as a function of a pressure that is measured after or downstream of a conventional filter changer.

BRIEF SUMMARY OF THE INVENTION

The object of the invention is to propose a device with which a pressure constant and a flow-volume constant are achievable in the area of the discharge channel. This underlying object of the invention is accomplished by the teachings of the claims.

The device is a filter changer that has a housing that includes a feed channel and a discharge channel and a slidable filter slide with at least two filter chambers. At least one filter element each is arranged in each respective filter chamber. The filter slide is slidably mounted transverse to the flow direction of the liquid plastic material and each filter element is shiftable into the flow path between the feed channel and the discharge channel.

The main claim proposes a practical or concrete device that not only accelerates and improves the backwash effect relative to the one disclosed in DE 10 2004 036 597 B3, but also has a simpler construction. In this arrangement, a storage space with a displacing piston disposed therein is provided in the feed channel. A pressure generator is then provided between the opening of this storage space with the displacing piston and the actual filter changer, so that, when the sensor provided on the discharge channel is triggered, the displacing piston is actuated and thus discharges material from the storage space into the feed channel. At the same time, the pressure generator controls this additional material by being rotatably driven at a correspondingly faster speed.

During normal operation, the pressure generator, such as, for example, a gear pump, runs with an appropriate output and ensures that the possible pressure drop that can occur when the storage space for the displacing piston is filled with material cannot have an affect on the filter changer and the moulds connected to it. If a pressure drop on the output side of the pressure generator now occurs as a result of the backwashing process or, for example, because of venting of the filter changer, caused by material being removed from the process, the pressure generator is also activated. At the same time, the displacing piston is working, feeding the plastic material located in the storage space into the feed channel. As a result, the material that the displacing piston presses out of the storage space and into the feed channel counterbalances the pressure drop occurring in the feed channel on the suction side of the pressure generator because of the increased output of the pressure generator.

It is accordingly proposed to arrange the pressure generator in the feed channel in the flow direction of the fluid upstream of the storage space that is equipped with a displacing piston or before the opening of the storage space, whereby the pressure generator operates with greater output when the storage space is being filled.

A device is also proposed according to the invention in which a sensor is arranged in the discharge channel. The sensor controls and measures here the pressure and flow-through volume of the material. These values control a pressure generator on the one hand and, on the other, the operation of the feed device, for example, a double-screw extruder. If the value for the flow-through volume and/or the pressure value drops, the output of the feed device is automatically increased, i.e., more material is fed there and, simultaneously, the pressure generator that normally rotates with a constant number of revolutions is driven at a higher rotational speed, so that the pressure drop and the volume drop that occurs when material is removed from the process here by backwashing or venting are finely counterbalanced.

In other words, a constant pressure and a constant flow-through volume are achieved in the area of the discharge channel.

BRIEF DESCRIPTION OF THE DRAWINGS

Embodiments of the invention are described below based on the drawings.

DETAILED DESCRIPTION OF THE INVENTION

Figure 1:
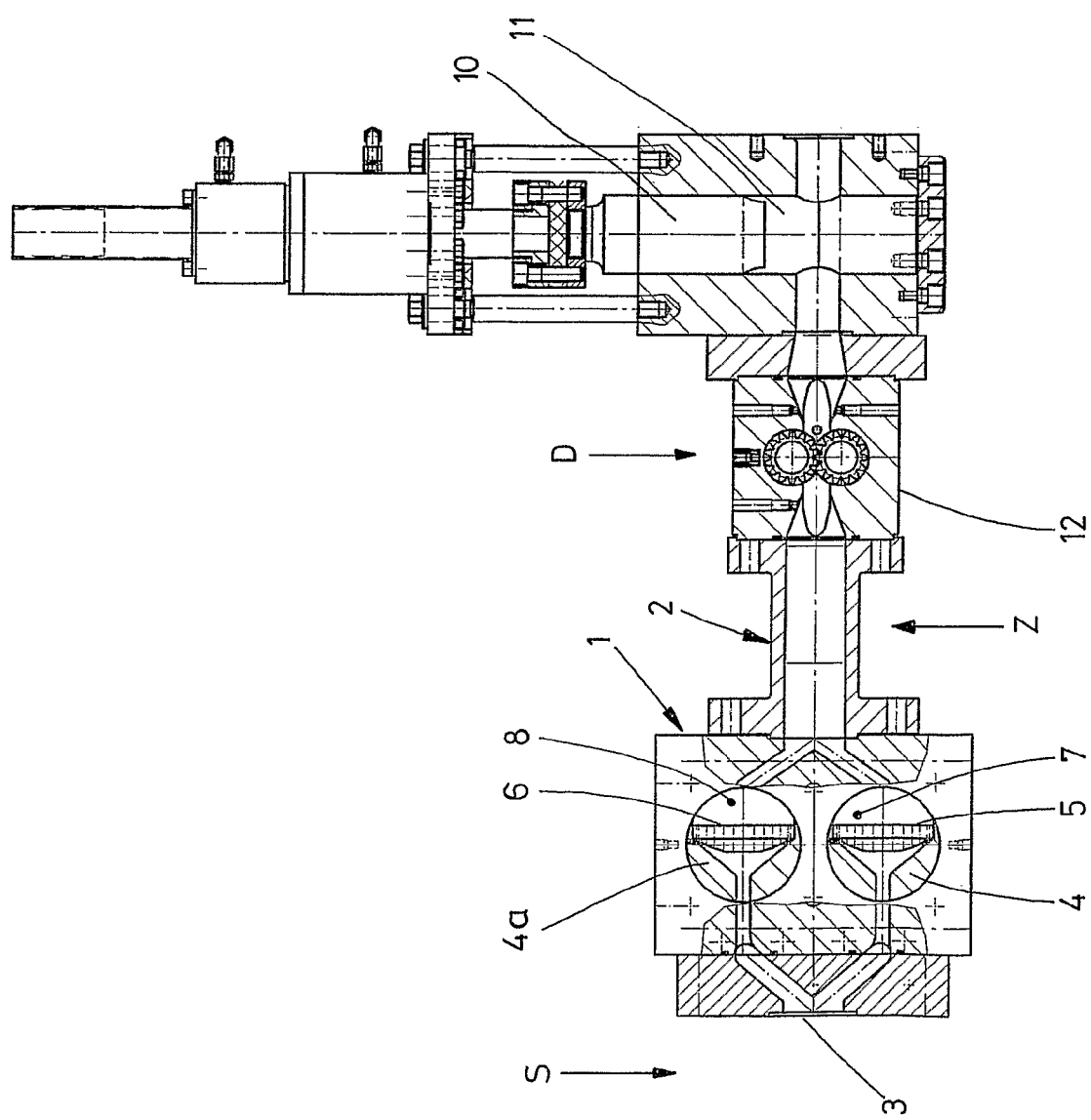
FIG. 1 illustrates the filter changer with pressure generator and displacing piston device according to the invention, showing the position of the displacing piston when the storage space is filled with material.
Figure 2:
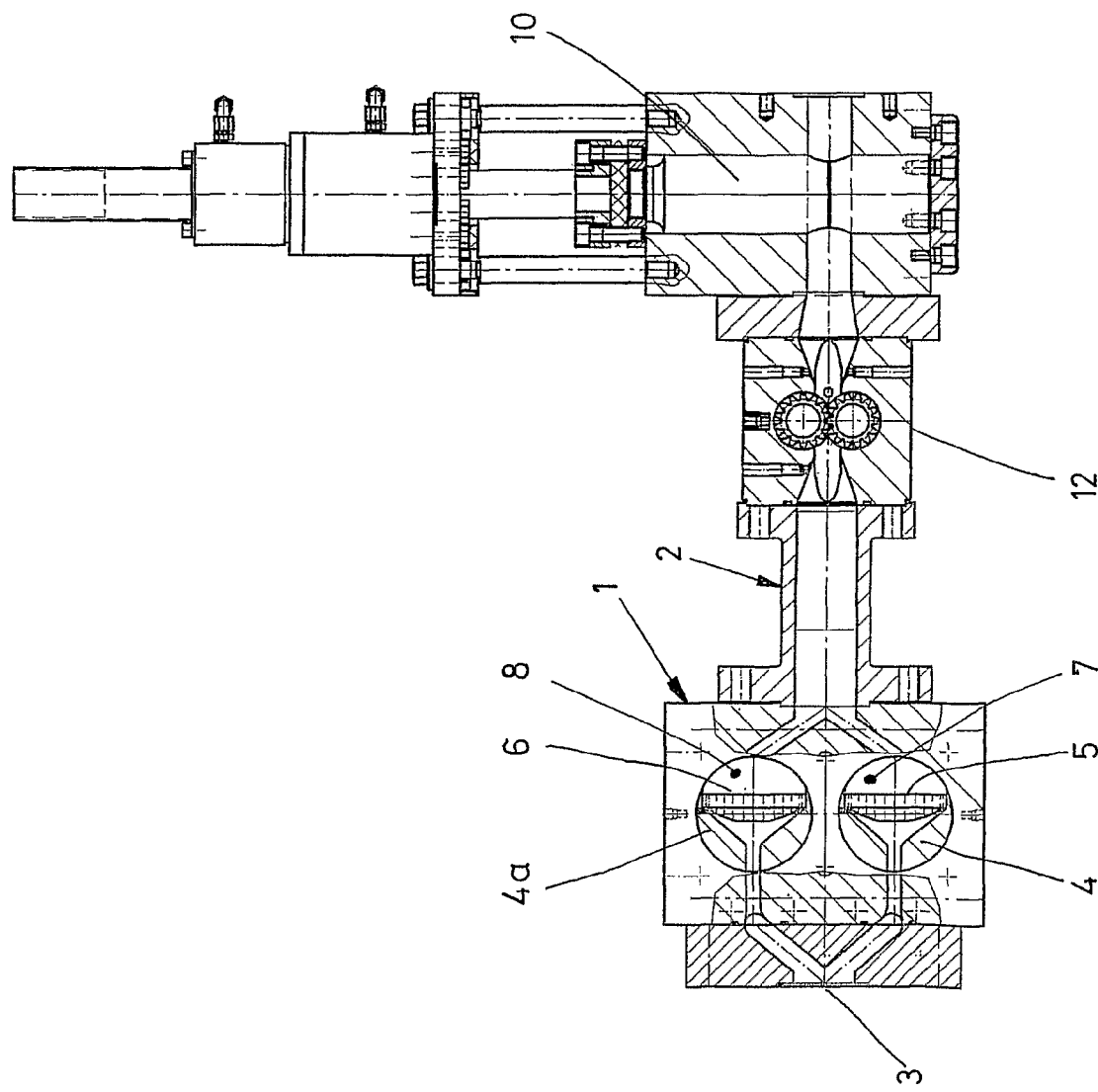
FIG. 2 illustrates the arrangement according to FIG. 1, whereby the displacing piston has now pressed out the material located in the storage space.

FIGS. 1 and 2 show a housing 1 of a filter changer, which is equipped with a feed channel 2 and a discharge channel 3. Filter slides 4 and 4a are arranged within this housing 1, each of which contains at least one filter element 5, 6 in a corresponding filter area 7, 8, whereby these filter areas 7, 8 are connected to, i.e., are in a flowpath with, the feed channel 2, and the outflow side of the filter elements 5, 6 are connected to or in a flowpath with the discharge channel 3.

A pressure generator 12, preferably constructed as a gear pump, is arranged in the feed channel 2. A liquefied material accumulator that essentially comprises a displacing piston 10 and a storage space 11 is connected upstream to this pressure generator 12.

Is the displacing piston 10 in its raised position, as shown in FIG. 1, then the storage space 11 has a flowpath connection with the feed channel 2; and flowing plastic material that is in the feed channel 2 flows into the storage space 11 until it is filled.

Arranged in the area of the discharge channel 3 is a sensor S, which monitors the pressure and the flow volume of the material flowing here. A control Z is provided in the area of the feed channel 2 and a control device D in the area of the pressure generator 12. The control Z controls the fill level of the feed channel 2 and the control device D influences the output of the pressure generator 12.

A negative change in the area of the sensor S causes an increase in the fill level of the feeding device 2, for example, by actuating the piston 10 and simultaneously having the pressure generator 12 rotate with a higher output.

Should a pressure drop occur in the discharge channel 3 during the backwashing or venting of the filter changers, and, thus, a pressure drop with regard to the moulds arranged in the discharge channel 3, the output of the pressure generator 12 is correspondingly increased. At the same time, stored plastic material stored is pushed by the displacing piston 10 out of the storage space 11 into the feed channel 2, whereby the action of the pressure generator 12 now prevents the pressure exerted by the displacing piston 10 from also being exerted to the right in the feed channel 2 shown in FIGS. 1 and 2, that is, against the normal flow of the material flowing into the feed channel 2.

Figure 3:
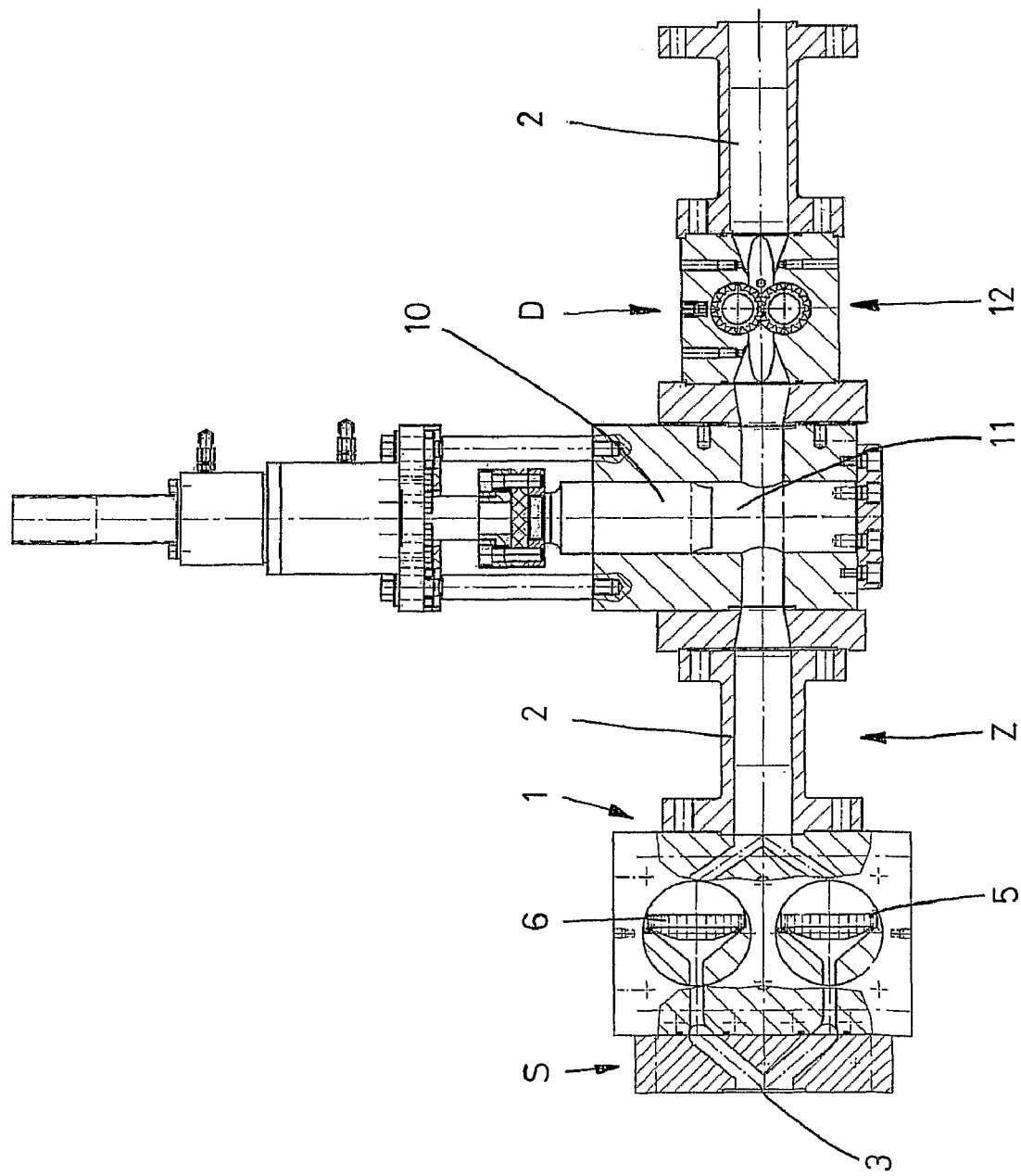
FIG. 3 illustrates an arrangement such, that the pressure generator, seen in the flow direction of the fluid, is arranged upstream of the opening of the storage space.

The embodiment shown in FIG. 3 also depicts a housing 1 of a filter changer, the housing 1 equipped with a feed channel 2 and a discharge channel 3. Filter elements 5 and 6 are arranged inside this housing. A pressure generator 12, which is preferably constructed as a gear pump, is provided in the feed channel 2 and connected downstream of this pressure generator 12 is a liquefied material accumulator, which essentially comprises a displacing piston 10 and a storage space 11.

Is the displacing piston 10 in its raised position, as shown in FIG. 3, then the storage space 11 is connected to or has a flowpath with the feed channel 2; and flowing plastic material that is in the feed channel 2 flows into the storage space 11 until it is filled.

Here, too, a sensor S is arranged in the area of the discharge channel 3. This sensor S monitors the pressure and the flow-through volume of the material flowing here. A control Z is provided in the area of the feed channel 2 and a control device D is provided in the area of the pressure generator 12. The control Z controls the fill level of the feed device 2; and the control device D influences the output of the pressure generator.

In this arrangement, the pressure generator 12 operates at a greater output when the storage space 11 is being filled.

What is claimed is:

1. Device for filtering a fluid, particularly a liquefied plastic, the device comprising:
    a housing (1) of a filter changer, the housing having a feed channel (2) and a discharge channel (3);
    a filter slide (4, 4a) that is arranged in the flowpath of the fluid to be filtered and is slidable transverse to a flow direction of the fluid, so as to open and close a flowpath between the feed channel and the discharge channel;
    at least one filter element (5, 6), each one filter element arranged in a corresponding filter chamber (7, 8) in the filter slide;
    a storage space (11) arranged in the flowpath of the feed channel, upstream of the filter slide, the storage space equipped with a displacing piston (10); and
    a pressure generator (12) arranged in the flowpath of the feed channel, wherein, during normal operation, a pressure generator output is at a first operating level;
    a sensor (S) associated with the discharge channel; and
    a controller adapted to affect the operation of the displacing piston and the pressure generator in response to a signal from the sensor;
    wherein, when a pressure drop is sensed at the discharge channel, the pressure generator output is increased to a second operating level that is higher than the first operating level, such that interaction of the pressure generator and the displacing piston counterbalances a pressure drop in the discharge channel.

2. Device according to claim 1, wherein the pressure generator is constructed as a gear pump.

3. Device according to claim 1 further comprising:
    the sensor (S) in the area of the discharge channel for measuring pressure and flow volume;
    the controller comprising both a control (Z) for the fill level of the feed channel and a control device (D) for the pressure generator arranged in the feed channel;
    wherein the sensor acts on the control for the fill level and the control device for the pressure generator.

4. Device for filtering a fluid, particularly a liquefied plastic, the device comprising:
- a housing (1) of a filter changer, the housing having a feed channel (2) and a discharge channel (3);
- a filter slide (4, 4*a*) that is arranged in the flowpath of the feed channel and is slidable transverse to a flow direction of the fluid, so as to provide a flowpath between the feed channel and the discharge channel;
- at least one filter element (5, 6), each one filter element arranged in a corresponding filter chamber (7, 8) in the filter slide;
- a storage space (11) provided in the flowpath of the feed channel, upstream of the filter slide, the storage spaced equipped with a displacing piston (10);
- a pressure generator (12) arranged between the storage space and the feed channel;
- a sensor (S) for measuring pressure and flow volume of the discharge channel;
- a control (Z) for regulating the fill level of the feed channel; and
- a control device (D) for controlling the pressure of the pressure generator;
- wherein, when pressure or flow volume in the area of the discharge channel decreases, or when material is removed from the process as a result of backwashing or venting, the displacing piston operates effectively and the pressure generator operates at a higher output; and
- wherein the sensor acts on the control for the fill level and the control device for the pressure generator.

5. Device according to claim 4, wherein the pressure generator is constructed as a gear pump.

6. Device for filtering a fluid, particularly a liquefied plastic, the device comprising:
- a housing (1) of a filter changer, the housing having a feed channel (2) and a discharge channel (3);
- a filter slide (4, 4*a*) that is arranged in the flowpath of the liquid to be filtered and is slidable transverse to a flow direction, so as to provide a flowpath to the feed channel and the discharge channel;
- at least one filter element (5, 6), each one filter element arranged in a corresponding filter chamber (7, 8) in the slidable filter slide;
- a storage space (11) arranged in the flowpath of the feed channel, upstream of the filter slide, and equipped with a displacing piston (10);
- a pressure generator (12) that is provided in the feed channel in the flow direction of the fluid, upstream of the storage space;
- a sensor (S) in the area of the discharge channel for measuring pressure and flow volume;
- a control (Z) for the fill level of the feed channel; and
- a control device (D) for a pressure generator (12) arranged in the feed channel;
- wherein the pressure generator operates at a higher output when the storage space is being filled; and
- wherein the sensor acts on the control for the fill level and the control device for the pressure generator.

7. Device according to claim 6, wherein the pressure generator is constructed as a gear pump.

\* \* \* \* \*